M. G. MELVIN.
LUBRICATOR.
APPLICATION FILED APR. 1, 1909.

955,652.

Patented Apr. 19, 1910.

Inventor
Mark G. Melvin
By Victor J. Evans
Attorney

Witnesses
Frank B. Hoffman
C. C. Hines

UNITED STATES PATENT OFFICE.

MARK G. MELVIN, OF SCRANTON, PENNSYLVANIA.

LUBRICATOR.

955,652.  Specification of Letters Patent.  Patented Apr. 19, 1910.

Application filed April 1, 1909. Serial No. 487,348.

*To all whom it may concern:*

Be it known that I, MARK G. MELVIN, a citizen of the United States, residing at Scranton, in the county of Lackawanna and State of Pennsylvania, have invented new and useful Improvements in Lubricators, of which the following is a specification.

This invention relates to lubricators of the character adapted particularly for use upon the driving rods of locomotives and other engines for lubricating the bearings thereof, and in which a grease or solid lubricant is customarily employed.

The lubricators now in common use consist generally of an internally threaded cup fixed to the rod and in which is threaded a plug acting as a closure and a follower by which the lubricant may be fed, which plug is provided with a wrench head and a jam nut for locking it in adjusted position.

Owing to the violent motion of the driving rod, this jam nut frequently becomes loosened and allows the plug to work out and drop from the cup, whereby a considerable loss is entailed in the operation of a large number of locomotives. The loss of the plug also results in the exposure and contamination of the lubricant and the insufficient feed of the latter to the journal bearing, by which the latter runs dry with obvious deleterious effects. Furthermore, the jam nuts are screwed so tight in an endeavor to prevent loss of the plugs, that they frequently cannot be loosened by the engineer while the engine is standing a short time at a station, so that the engineer cannot adjust the lubricators to feed the lubricant within the limited period at his command, whereby the bearings frequently run dry from this cause.

One object of my invention is to provide a lubricator in which the plug, follower or feed device is so mounted upon and connected with the cup that it cannot possibly become loosened and lost, but which may at the same time be easily and quickly adjusted to feed the lubricant as occasion requires.

Another object of the invention is to provide a lubricator which is simple of construction, comparatively inexpensive of production and effective in its feed action.

With these and other objects in view, the invention consists of the features of construction, combination and arrangement of parts hereinafter fully described and claimed, reference being had to the accompanying drawing, in which:—

Figure 1:
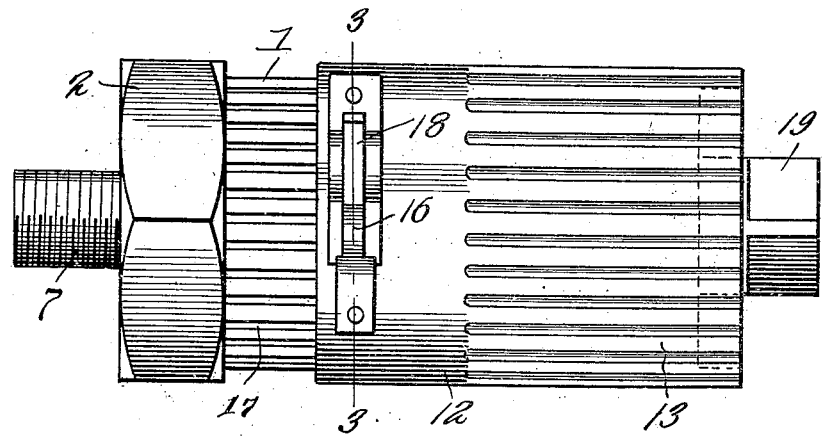
Figure 2:
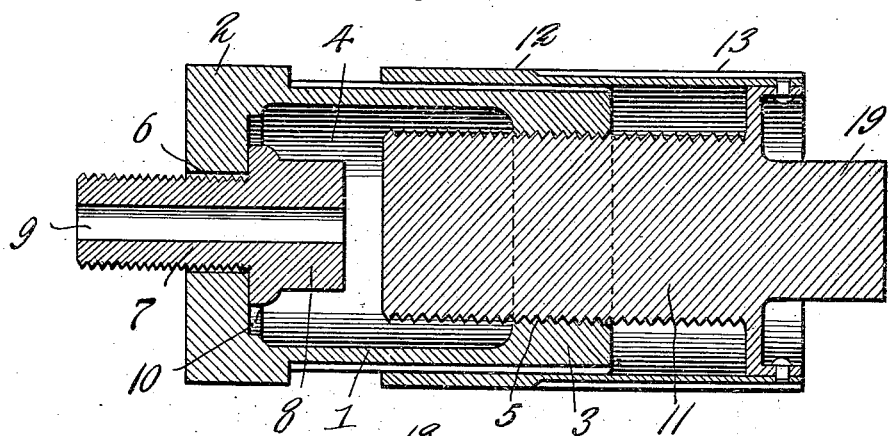
Figure 3:
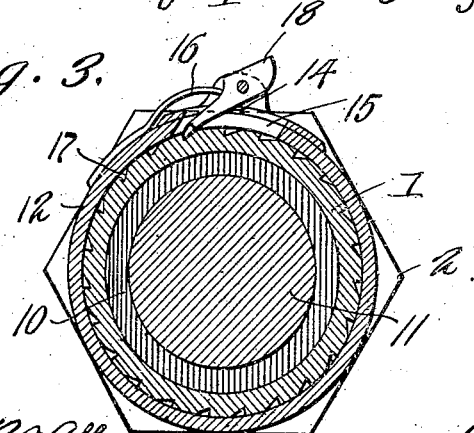
Figure 4:
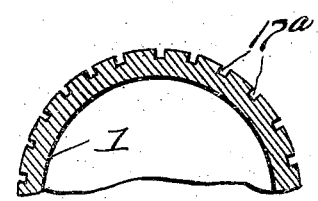

Figure 1 is a side elevation of a lubricator embodying my invention, arranged for convenience of illustration in a horizontal position. Fig. 2 is a central longitudinal section of the same. Fig. 3 is a transverse section on the line 3—3 of Fig. 1. Fig. 4 is a fragmentary transverse section of the cup showing a slight modification.

Referring to the drawings, 1 designates the cup, which is preferably in the form of a cylindrical shell having an enlarged angular base 2 adapted for the application of a wrench and a head 3 of either cylindrical or angular form, as desired. The portion of the cup or shell between the base and head forms a chamber or compartment 4 for the reception of the lubricant, which is introduced into said compartment through a threaded opening 5, in the head 3. The base 2 is formed with an opening 6 for the passage of a fastening screw 7, the projecting end of the shank of which is adapted to be screwed into a threaded opening communicating with the bearing in the driving rod to secure the cup in position thereon. The screw is formed at its upper end within the compartment 4 with an angular head 8 which is adapted for engagement with a socket wrench inserted through the opening 5, and said screw is also provided with a longitudinal passage 9 for the feed of lubricant from the compartment 4 to the bearing. The base of the head 8 may seat within a socket 10 formed in the bottom of the cup.

A threaded feed plug or follower 11 is provided to work within the threaded opening 5 and force the lubricant from the chamber 4 through the feed passage 9. Connected at its upper end in any suitable manner to this feed plug or follower is a collar or sleeve 12 which incloses the cup 1 and forms a grip or handle by which the plug may be turned in and out. In order to facilitate the manipulation of the sleeve, the upper surface of the latter may be longitudinally grooved or otherwise formed to provide a milled or serrated gripping surface 13. On the lower portion of the sleeve is a pivoted dog or pawl 14 projecting inwardly through a slot 15 therein and normally held in engagement with the surface of the cup by a spring 16. The periphery of the cup is longitudinally grooved to provide ratchet teeth 17 having inclined front and straight rear shoulders for engagement by the tooth of the pawl to permit the sleeve to be turned in a clockwise direction to feed the plug 11 downward and to prevent turning of said sleeve in a counter-clockwise or retrograde direction, so that the collar and sleeve cannot work loose and become lost under the motion of the rod. The outer end of the pawl or dog is provided with a finger piece 18 by which it may be retracted to adapt the collar and plug to be removed from the cup when it is desired to clean or replenish the same with lubricant.

If desired, the ratchet teeth may be formed with straight parallel walls, as indicated at 17ª in Fig. 4, or otherwise shaped for use in conjunction with a suitable locking pawl or dog for the purpose described, or any other suitable type of pawl and ratchet mechanism may be employed. In the present instance I have shown the feed plug provided at its outer end with an angular head 19 for the application of a wrench whereby the plug and sleeve may be turned in the event that, through clogging of the ratchet teeth or other cause, the collar or sleeve cannot be easily turned by hand.

It will be seen from the foregoing description that my invention provides a lubricator in which the feed plug is held and prevented from working loose under the motion of the driving rod, by which the loss of this part will be obviated and the objections incident thereto avoided. It will also be seen that the invention provides a means by which the plug may be easily and quickly turned by hand or a wrench to feed a quantity of the lubricant as occasion requires, so that the engineer of a locomotive, for instance, may quickly and conveniently adjust the cups to supply a further feed of lubricant to the journal bearings, thus further overcoming the objection hereinbefore mentioned.

Having thus fully described the invention, what is claimed as new, is:—

1. A lubricator comprising a cup having an outlet at its bottom and a threaded opening at its top and provided with exterior ratchet teeth along the entire length thereof, a threaded plug working through said threaded opening, a sleeve carried by the plug and loosely telescoping about the cup, said sleeve being provided with an exterior gripping surface, and a spring actuated pawl upon the sleeve to engage the ratchet teeth of the cup, said pawl being adapted to engage the ratchet teeth at any point in the length of the cup to hold the sleeve against retrograde rotation thereon.

2. A lubricator comprising a cup having an outlet at its bottom and a threaded opening at its top and formed with an annular series of exterior ratchet teeth extending longitudinally the full length thereof, a threaded plug working through said threaded opening, a sleeve carried by the plug and telescoping loosely about the cup, said sleeve being provided with a milled exterior surface, a transversely arranged spring actuated pawl upon the sleeve having a tooth projecting therethrough to engage the ratchet teeth of the cup, said pawl being operative to engage said ratchet teeth at any point along the length of the cup to hold said sleeve against retrograde rotation.

3. A lubricator comprising a cup having an outlet at its bottom and a threaded opening at its top and provided with exterior ratchet teeth along the entire length thereof, a threaded plug working through said threaded opening, a sleeve carried by the plug and telescoping loosely about the cup, said sleeve being provided with a milled exterior surface and a circumferential slot, and a spring actuated pawl arranged transversely of said sleeve and projecting through said slot to engage said ratchet teeth, said pawl being adapted to engage said ratchet teeth at any point along the length of the cup to hold the sleeve against retrograde rotation.

In testimony whereof I affix my signature in presence of two witnesses.

MARK G. MELVIN.

Witnesses:
C. C. HINES,
E. A. WAKEFIELD.